United States Patent
Miyakawa et al.

(10) Patent No.: US 10,165,568 B2
(45) Date of Patent: Dec. 25, 2018

(54) DATA COMMUNICATION APPARATUS, COMPUTER READABLE MEDIUM, AND SATELLITE COMMUNICATION SYSTEM

(71) Applicants: SoftBank Corp., Tokyo (JP); Thaicom Public Company Limited, Nonthaburi (TH)

(72) Inventors: Junichi Miyakawa, Tokyo (JP); Yoshihito Shimazaki, Kanagawa (JP); Akihiko Tajika, Saitama (JP); Isara Amatayakul, Nonthaburi (TH); Sakon Kittivatcharapong, Nonthaburi (TH)

(73) Assignees: SoftBank Corp., Tokyo (JP); Thaicom Public Company Limited, Nonthaburi (TH)

(*) Notice: Subject to any disclaimer, the term of this patent is extended or adjusted under 35 U.S.C. 154(b) by 164 days.

(21) Appl. No.: 15/406,793

(22) Filed: Jan. 16, 2017

(65) Prior Publication Data

US 2017/0135107 A1    May 11, 2017

Related U.S. Application Data

(63) Continuation of application No. PCT/JP2014/003779, filed on Jul. 16, 2014.

(51) Int. Cl.
*H04W 72/04* (2009.01)
*H04W 84/06* (2009.01)
*H04B 7/185* (2006.01)

(52) U.S. Cl.
CPC .... *H04W 72/0453* (2013.01); *H04B 7/18515* (2013.01); *H04B 7/18543* (2013.01); *H04W 84/06* (2013.01)

(58) Field of Classification Search
CPC ......... H04W 72/0453; H04W 72/0446; H04W 72/04; H04W 72/044; H04W 84/06;
(Continued)

(56) References Cited

U.S. PATENT DOCUMENTS

| 6,292,664 | B1  | 9/2001 | Ostrup et al. |
| 6,377,561 | B1* | 4/2002 | Black ................. H04B 7/18584 370/330 |

FOREIGN PATENT DOCUMENTS

| JP | H8-140147 A    | 5/1996 |
| JP | 2003-318968 A  | 11/2003 |
| JP | 2008-263282 A  | 10/2008 |

OTHER PUBLICATIONS

International Search Report for International Application No. PCT/JP2014/003779, issued by the Japan Patent Office dated Oct. 14, 2014.

(Continued)

*Primary Examiner* — Candal Elpenord
*Assistant Examiner* — Ricardo H Castaneyra

(57) ABSTRACT

When bandwidth is dynamically allocated for audio communication via satellite communication, newly occurring audio communication can negatively affect the communication quality of the existing audio communication. Provided is a data communication apparatus that communicates via a satellite and includes an allocation control section that allocates in advance, for audio communication via the satellite, a bandwidth that is larger than a bandwidth needed for current audio communication being performed via satellite by at least a predetermined bandwidth. A program causes a computer to function as this data communication apparatus. A satellite communication system includes this data communication apparatus and this satellite.

20 Claims, 5 Drawing Sheets

(58) Field of Classification Search
CPC .. H04W 16/10; H04W 28/20; H04B 7/18543; H04B 7/18515; H04L 41/0896; H04L 43/16; H04L 43/0882; H04L 47/12; H04L 47/10; H04L 65/4084; H04L 5/001
See application file for complete search history.

(56) References Cited

OTHER PUBLICATIONS

International Preliminary Report on Patentability for International Application No. PCT/JP2014/003779, issued by the International Bureau of WIPO dated Jan. 26, 2017.

* cited by examiner

DATA COMMUNICATION APPARATUS, COMPUTER READABLE MEDIUM, AND SATELLITE COMMUNICATION SYSTEM

CROSS REFERENCE TO RELATED APPLICATION

The contents of the following international application are incorporated herein by reference, International Application No. PCT/JP2014/003779 filed on Jul. 16, 2014.

BACKGROUND

1. Technical Field

The present invention relates to a data communication apparatus, a computer readable medium, and a satellite communication system.

2. Related Art

A mobile telephone network system is known that uses one of a plurality of portable wireless LAN access points forming a temporary speech communication network as an SIP server, connects the SIP server to a satellite mobile telephone, and connects the temporary speech communication network to another public line network via satellite communication using the satellite mobile telephone.
Patent Document 1: Japanese Patent Application Publication No. 2008-263282

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
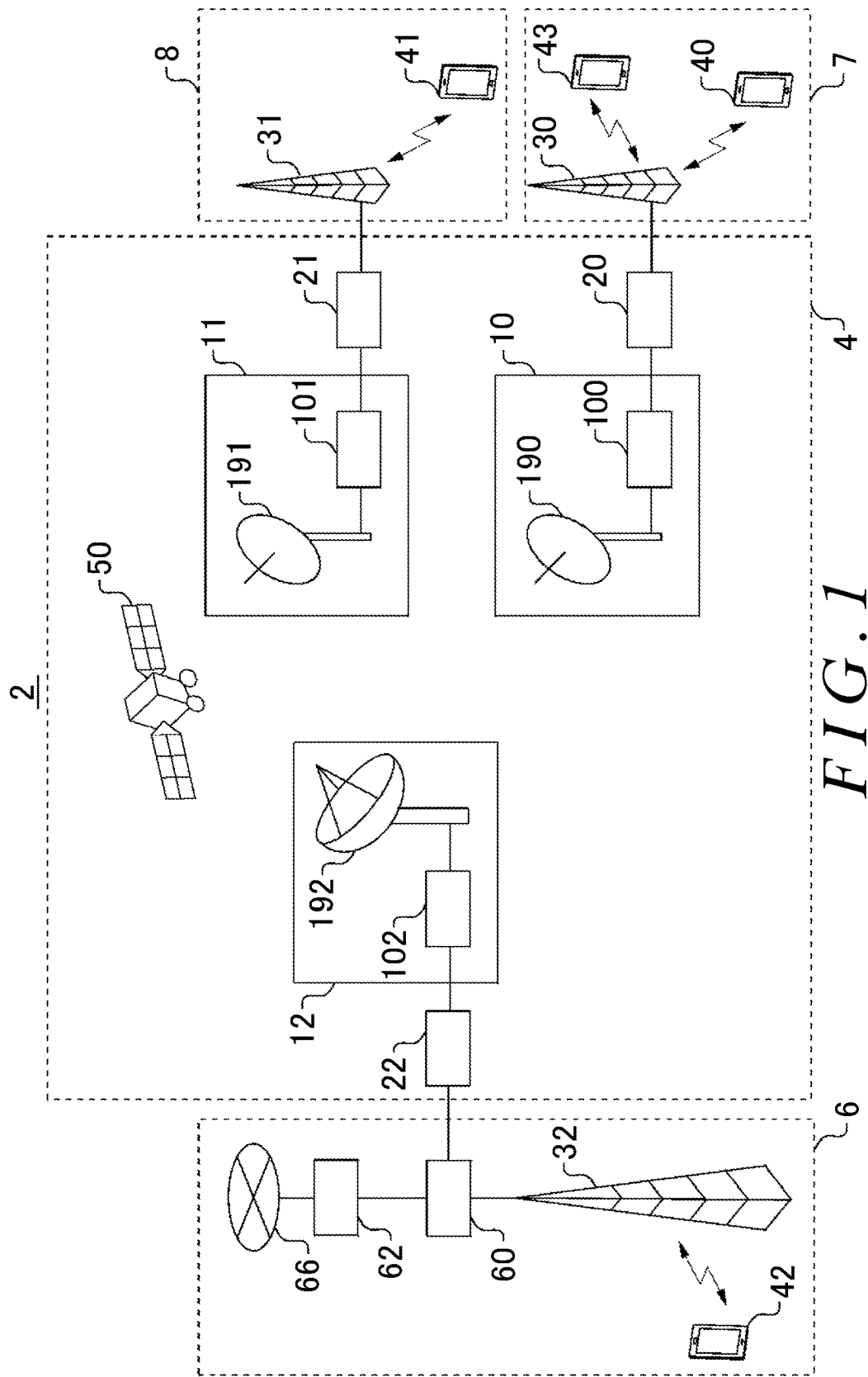
FIG. 1 schematically shows a communication system 2 according to an embodiment.

FIG. 1 schematically shows a communication system 2 according to an embodiment. The communication system 2 includes a satellite communication system 4, a ground communication system 7, and a ground communication system 8. The satellite communication system 4 connects the ground communication system 7 and the ground communication system 8 to a ground communication system 6, via a communication satellite 50.

The ground communication system 7 and the ground communication system 8 are communication systems in regions with low population density, such as remote islands, mountainous regions, or the like. The number of people accommodated per one base station in the ground communication system 6 is greater than the number of people accommodated per one base station in the ground communication system 7 and the ground communication system 8, for example. The ground communication system 6, the ground communication system 7, and the ground communication system 8 communicate with each other via the satellite communication system 4.

The satellite communication system 4 includes a satellite communication apparatus 10 an IF conversion apparatus 20, a satellite communication apparatus 11, an IF conversion apparatus 21, a communication satellite 50, a satellite communication apparatus 12, and an IF conversion apparatus 22. The satellite communication apparatus 10 includes a modem 100 and an antenna 190. The satellite communication apparatus 11 includes a modem 101 and an antenna 191.

The ground communication system 6 includes a base station 32, a base station control apparatus 60, a moving communication exchange station 62, a public telephone exchange line network 66, and a user terminal 42. The ground communication system 7 includes a base station 30, a user terminal 40, and a user terminal 43. The ground communication system 8 includes a base station 31 and a user terminal 41.

The user terminal 40, the user terminal 41, the user terminal 42, and the user terminal 43 have audio communication functions. Furthermore, the user terminal 40, the user terminal 41, the user terminal 42, and the user terminal 43 have data communication functions. The user terminal 40, the user terminal 41, the user terminal 42, and the user terminal 43 are mobile telephone devices such as smart-phones, for example.

In the satellite communication system 4, the base station 30 and the base station 31 are each provided in regions with low population density or the like. The base station 30 receives traffic from the user terminal 40 and the user terminal 43, and outputs the traffic to the IF conversion apparatus 20. The traffic from the user terminal 40 and the user terminal 43 contains audio communication traffic, data communication traffic, and the like.

The IF conversion apparatus 20 is provided between the base station 30 and the satellite communication apparatus 10. Specifically, the IF conversion apparatus 20 is provided between the base station 30 and the modem 100. The IF conversion apparatus 20 converts the traffic received from the base station 30 into packets such as IP packets, and outputs these packets to the modem 100. Furthermore, the IF conversion apparatus 20 converts the packets output from the modem 100 into traffic for the base station 30, and outputs this traffic to the base station 30. The base station 30 communicates with the user terminal 40 and the user terminal 43, according to this traffic.

The modem 100 is an example of a data communication apparatus that communicates via the communication satellite 50. The modem 100 modulates the packet signal from the IF conversion apparatus 20, and outputs the obtained modulated signal to the antenna 190. The antenna 190 outputs the modulated signal output from the modem 100 as a radio wave. The radio wave output from the antenna 190 is received by the antenna 192 via the communication satellite 50. Furthermore, the antenna 190 generates a reception signal based on the radio wave received from the communication satellite 50, and outputs the reception signal to the modem 100. The modem 100 demodulates the reception signal output from the antenna 190, and outputs the obtained packets to the IF conversion apparatus 20.

The communication satellite 50 relays the radio waves between the antenna 190 and the antenna 192. The antenna 192 generates a reception signal based on the radio waves received from the communication satellite 50, and outputs the reception signal to the modem 102. The modem 102 demodulates the reception signal output from the antenna 190, and outputs the obtained packets to the IF conversion apparatus 22. Furthermore, the modem 100 modulates the packet signal obtained from the IF conversion apparatus 22, and outputs the obtained modulated signal to the antenna 192. The antenna 192 outputs the modulated signal output from the modem 102 as radio waves. The radio waves output from the antenna 192 are received by the antenna 190 via the communication satellite 50.

The IF conversion apparatus 22 is provided between the base station control apparatus 60 and the satellite communication apparatus 12. Specifically, the IF conversion apparatus 22 is provided between the base station control apparatus 60 and the modem 102. The IF conversion apparatus 22 converts the packets output from the modem 102 into traffic for the base station control apparatus 60, and outputs this traffic to the base station control apparatus 60. Furthermore, the IF conversion apparatus 22 converts the traffic received from the base station control apparatus 60 into packets such as IP packets, and outputs the packets to the modem 102.

The base station control apparatus 60 is connected to the base station 32. Furthermore, the base station control apparatus 60 is connected to the moving communication exchange station 62. The base station control apparatus 60 outputs the traffic obtained from the IF conversion apparatus 22 to the base station 32 or the moving communication exchange station 62, according to the address of the traffic. For example, when the address of the traffic is the user terminal 42, the base station control apparatus 60 transmits this traffic to the base station 32 wirelessly connected to the user terminal 42.

The base station control apparatus 60 receives traffic relating to the user terminal 42 from the base station 32, and relays this traffic to the communication exchange station that is a target for the traffic. For example, the base station control apparatus 60 outputs traffic destined for the user terminal 40 to the IF conversion apparatus 22. Furthermore, the base station control apparatus 60 outputs the traffic destined for a terminal connected to the public telephone exchange line network 66 to the moving communication exchange station 62 that is an exchange station of the public telephone exchange line network 66. The traffic from the user terminal 42 contains audio communication traffic, data communication traffic, and the like.

The ground communication system 8 has the same configuration as the ground communication system 7. Specifically, the base station 31 has the same functions as the base station 30. Furthermore, the user terminal 41 has the same functions as the user terminal 40 and the user terminal 43. In the satellite system 4, the IF conversion apparatus 21 has the same functions as the IF conversion apparatus 20. The satellite communication apparatus 11 has the same functions and configuration as the satellite communication apparatus 10. Specifically, the modem 101 has the same functions and configuration as the modem 100. The antenna 191 has the same functions and configuration as the antenna 190. Therefore, descriptions of the operations of each component in the ground communication system 8, the IF conversion apparatus 21, and the satellite communication apparatus 11 are omitted. The description of the present embodiment mainly concerns the function of the modem 100.

In the satellite communication system 4, the modem 100 requests bandwidth allocation in the satellite communication apparatus 12, which is an earth station on the control side. In this case, the modem 100 requests the bandwidth allocation dynamically in the satellite communication apparatus 12, based on the amount of packets to be transmitted per unit time obtained from the IF conversion apparatus 20. In this way, it is possible to share the bandwidth of the satellite communication through the communication satellite 50 between the ground communication system 7 and the ground communication system 8, for example. Therefore, the usage efficiency of the bandwidth of the satellite communication can be improved.

Here, for the data communication, the modem 100 requests a bandwidth having a width substantially matching the current amount of packets per unit time output from the IF conversion apparatus 20. On the other hand, for the audio communication, the modem 100 requests a bandwidth that exceeds the bandwidth ensuring the conversations already being performed, by a bandwidth amount corresponding to one conversation. In this way, when a new call is generated from the user terminal 41 during the conversation using the user terminal 40, for example, before the bandwidth is actually allocated for the new call, an excess bandwidth that has already been allocated can be used to transmit the packets of the audio communication relating to the new call. Therefore, the audio quality of the existing communication using the user terminal 40 can be prevented from decreasing due to the newly occurring call. In order to simplify the explanation, the bandwidth allocation request made by the modem 100 is sometimes referred to simply as "allocating bandwidth" or the like.

Figure 2:
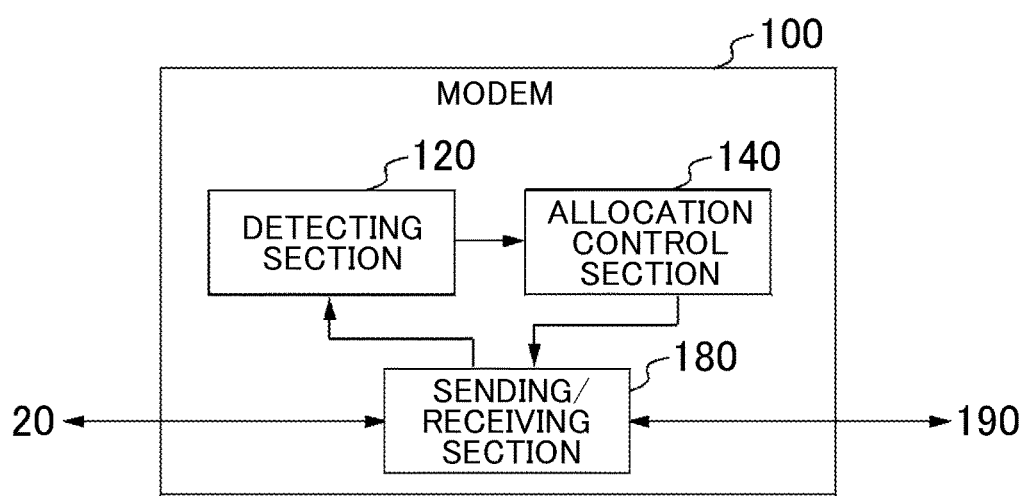
FIG. 2 schematically shows an exemplary function block configuration of the modem 100.

FIG. 2 schematically shows an exemplary function block configuration of the modem 100. The modem 100 includes a detecting section 120, an allocation control section 140, and a sending/receiving section 180.

The sending/receiving section 180 generates a signal to be transferred via the communication satellite 50. Specifically, the sending/receiving section 180 generates a transmission signal to be transmitted through the communication satellite 50. Furthermore, the sending/receiving section 180 generates a transmission signal to be transmitted via the IF conversion apparatus 20.

Specifically, the sending/receiving section 180 receives packets transmitted via the communication satellite 50, such as the packets for audio communication, the packets for data communication, or the like, from the IF conversion apparatus 20. The sending/receiving section 180 applies a modulation process, an amplification process, or the like to the packet signal obtained from the IF conversion apparatus 20, and outputs the resulting signal to the antenna 190. The antenna 190 transmits the signal output from the sending/receiving section 180. Furthermore, the sending/receiving section 180 transmits to the IF conversion apparatus 20 the packets obtained as a result of a demodulation process or the like performed on the signal obtained from the antenna 190.

The detecting section 120 detects the packets for audio communication from the transmission packets to be transmitted via the communication satellite 50. For example, the detecting section 120 detects that a transmission packet is an audio communication packet by analyzing the transmitted packets. The detecting section 120 detects the occurrence of audio communication based on the content of the transmission packets. Furthermore, the detecting section 120 detects the amount of data needed for the audio communication currently being performed, based on the amount of transmission packets of the audio communication to be transmitted within a predetermined time.

When a value indicating that there is a packet for audio communication is stored in a predetermined field in the transmission packet to be transmitted to the communication satellite 50, the detecting section 120 determines that the transmission packet is a packet for audio communication. As an example, a ToS field in the IP header in an IP packet can be used as the predetermined field in the packet.

The allocation control section 140 controls the bandwidth allocated to the modem 100 for the communication via the communication satellite 50. Specifically, for the audio communication via the communication satellite 50, the allocation control section 140 allocates in advance a bandwidth that exceeds the bandwidth needed for the audio communication currently being performed via the communication satellite 50, by at least a predetermined bandwidth. For the audio communication via the communication satellite 50, the allocation control section 140 allocates in advance a bandwidth larger than or equal to the predetermined bandwidth for both the upload and download directions.

Here, the predetermined bandwidth may be the bandwidth needed for one line of audio communication via the communication satellite 50. For example, in a case where a bandwidth of N bps per line is exclusively set for the audio communication, when the number of lines in which audio communication is currently occurring is M, the allocation control section 140 allocates a bandwidth of (M+1)×N bps for the audio communication.

In a state where audio communication is not occurring via the communication satellite 50, when audio communication does occur via the communication satellite 50, the allocation control section 140 allocates a bandwidth larger than or equal to the bandwidth needed for two lines of audio communication, for the audio communication via the communication satellite 50. Specifically, in a state where bandwidth is not allocated for audio communication via the communication satellite 50, when a packet for audio communication is detected from among the packets transmitted via the communication satellite 50, the allocation control section 140 allocates a bandwidth that is larger than or equal to the bandwidth needed for two lines of audio communication for the audio communication via the communication satellite 50. As described above, the packets for audio communication are detected by the detecting section 120.

When the bandwidth needed for the current audio communication is larger, the allocation control section 140 may set a larger difference between the bandwidth allocated in advance for the audio communication via the communication satellite 50 and the bandwidth needed for the current audio communication. Furthermore, the allocation control section 140 may adjust the bandwidth allocated in advance for the audio communication via the communication satellite 50 such that the ratio of the bandwidth allocated in advance for the audio communication via the communication satellite 50 to the bandwidth needed for the current audio communication does not exceed a predetermined threshold value.

When the bandwidth needed for the current audio communication has decreased, the allocation control section 140 decreases the bandwidth allocated for the audio communication via the communication satellite 50, such that a state is realized in which the a bandwidth is allocated that is larger than the bandwidth necessary for the current audio communication after the decrease by at least a predetermined bandwidth for the audio communication via the communication satellite 50. In this way, the allocation control section 140 frees up the unnecessary bandwidth, except for the predetermined bandwidth to be ensured in advance as excess.

Figure 3:
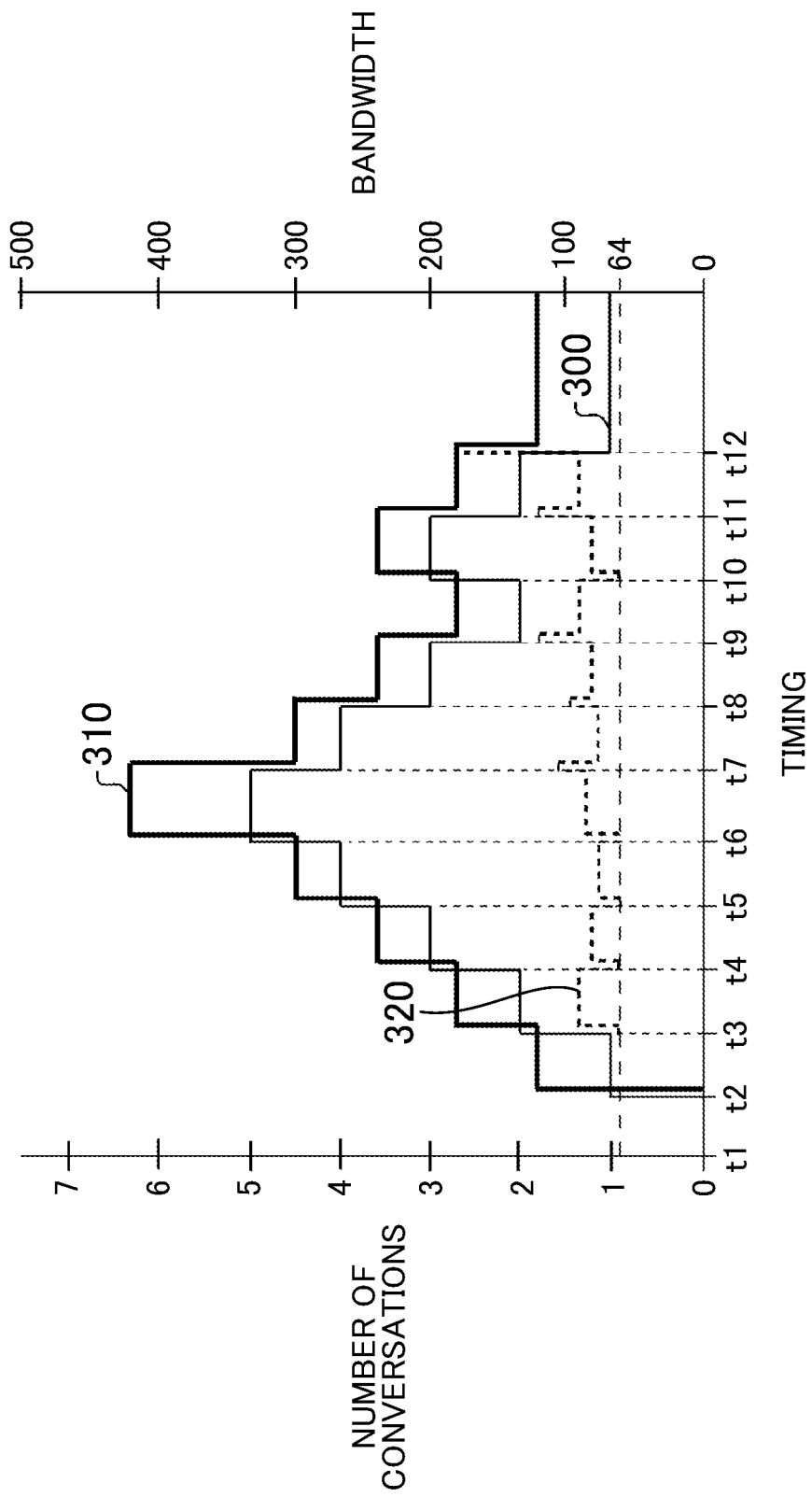
FIG. 3 schematically shows an exemplary change over time of the bandwidth allocated dynamically by the modem for the audio communication.

FIG. 3 schematically shows an exemplary change over time of the bandwidth allocated dynamically by the modem 100 for the audio communication. FIG. 3 shows the time expansion for each of 300 occurrences of the audio communication via the communication satellite 50, the bandwidth 310 allocated to the modem 100, and the bandwidth 320 allocated per one line.

At the timing t1, the bandwidth for the audio communication is not allocated. Here, in a state where the bandwidth for the audio communication is not allocated, when the detecting section 120 detects that one line of audio communication has occurred (timing t2), the allocation control section 140 allocates the bandwidth needed for two lines of audio communication. In a case where a bandwidth of 64 kbps per one line is exclusively set for the audio communication, the allocation control section 140 allocates a bandwidth of 128 kbps for the audio communication, according to the occurrence of one line of audio communication. A bandwidth of 64 kbps within this allocated bandwidth of 128 kbps is used for the transmission of data of the current audio communication detected at the timing t2. The remaining bandwidth of 64 kbps is not used for the transmission of data of the current audio communication detected at the timing t2. The remaining bandwidth of 64 kbps is an excess bandwidth allocated in advance for the audio communication, in a manner to be usable when further audio communication occurs in the future.

Next, at the timing t3, when the detecting section 120 detects that an additional one line of audio communication has occurred, the allocation control section 140 additionally allocates for the audio communication the bandwidth needed for the one line of audio communication. In this way, a bandwidth of 192 kbps is allocated for the audio communication. The additional audio communication allocated at the timing t3 uses the bandwidth of 64 kbps allocated in advance as excess after the timing t2, and transmission is possible. Accordingly, a bandwidth of 128 kbps within the allocated bandwidth of 192 kbps is used for the transmission of the data of the existing current audio communication detected at the timing t2 and of the additional audio communication detected at the timing t3. The remaining bandwidth of 64 kbps is not used for the transmission of data of the existing current audio communication or the additional audio communication. The remaining bandwidth of 64 kbps is an excess bandwidth allocated in advance for the audio communication, in a manner to be usable when further audio communication occurs in the future.

Since time is needed to perform the bandwidth allocation, as shown in the drawings, the bandwidth per one line in the current audio communication temporarily decreases from 128 kbps to 64 kbps. However, the bandwidth per one line in the current audio communication does not drop below 64 kbps, which is to be set per one line in the audio communication. Therefore, the conversation quality of the existing audio communication does not decrease due to the occurrence of the additional audio communication. Furthermore, it is possible to make calls quickly for the additionally occurring audio communication.

In the same manner, at each of the timing t4 and the timing t5, every time the detecting section 120 detects that an additional one line of audio communication occurs, the allocation control section 140 additionally allocates a bandwidth needed for one line of audio communication for the audio communication. In this way, as a result of the bandwidth allocation at the timing t5, a state is realized in which a bandwidth of 320 kbps is allocated for four lines of the audio communication.

At the timing t6, when the detecting section 120 detects that a further additional one line of audio communication has occurred, the allocation control section 140 additionally allocates a bandwidth necessary for two lines of audio communication, for the audio communication. In this way, it is possible to maintain the ratio of the excess bandwidth allocated for the audio communication to the bandwidth needed for the current audio communication in a state of being higher than a predetermined rate, e.g. a margin rate of 20%.

Specifically, at the timings t2, t3, t4, and t5, by allocating an excess bandwidth that is one line larger than the current audio communication, a margin rate exceeding 20% is realized. Therefore, the allocation control section 140 allocates an excess bandwidth that is one line larger than the current audio communication, as described above. In contrast to this, in order to realize a margin rate exceeding 20% for the five lines of audio communication at the timing t6, it is at least necessary to have a bandwidth for two lines of audio communication. Accordingly, as described above, the allocation control section 140 additionally allocates two lines of bandwidth, which is the minimum amount of bandwidth capable of realizing a margin rate of 20%, for the audio communication.

Next, at the timing t7, when the detecting section 120 detects that one line of audio communication has ended, the allocation control section 140 frees up the bandwidth needed for two lines of audio communication from the bandwidth allocated for the audio communication. In this way, the minimum bandwidth capable of realizing a margin rate of 20% is maintained. In the same manner, at the timings t8, t9, t10, t11, t12, and the like, every time the detecting section 120 detects that an additional one line of audio communication has occurred or ended, the bandwidth allocated for the audio communication is increased or decreased. The allocation control section 140 increases or decreases the bandwidth allocated for the audio communication such that a predetermined margin rate is realized for the current audio communication.

When the amount of packets for the audio communication transmitted per unit time has increased to be larger than or equal to a predetermined amount, the detecting section 120 detects that additional audio communication has occurred. Furthermore, when the amount of packets for the audio communication transmitted per unit time has decreased to be less than or equal to a predetermined amount, the detecting section 120 detects that audio communication has ended.

Figure 4:
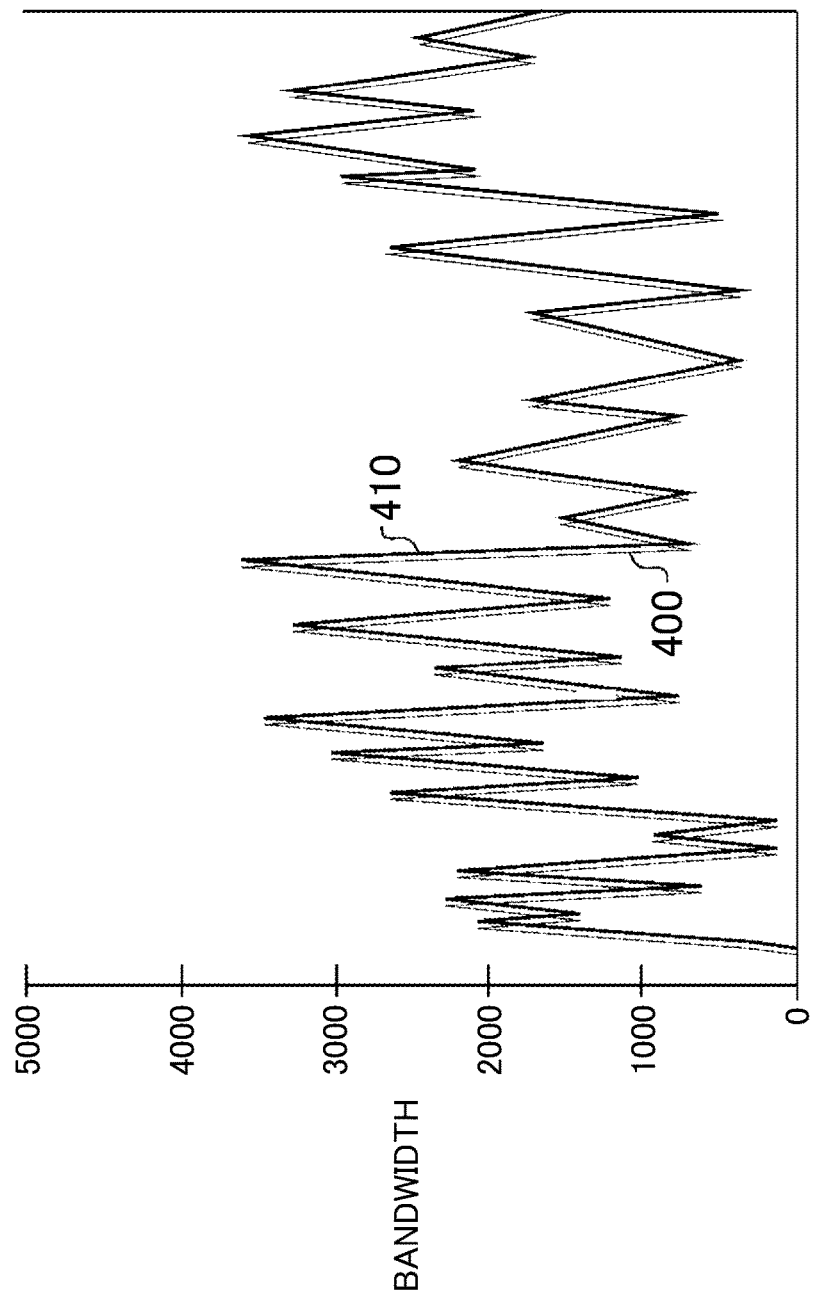
FIG. 4 schematically shows an exemplary change over time of the bandwidth dynamically allocated to the modem for data communication.

FIG. 4 schematically shows an exemplary change over time of the bandwidth dynamically allocated to the modem 100 for data communication. FIG. 4 shows the time expansion for each of the bandwidth 400 needed for the data communication via the communication satellite 50 and the bandwidth 410 allocated to the modem 100.

The allocation control section 140 allocates the bandwidth needed for data communication currently occurring, for the data communication. The allocation control section 140 performs control of the allocation of excess bandwidth for the audio communication as described above, but the allocation control section 140 does not perform control of the allocation of the excess bandwidth for the data communication. Accordingly, the allocation control section 140 dynamically allocates bandwidth substantially matching the bandwidth needed for the current data communication, for the data communication. A delay occurs from when the allocation control section 140 requests the bandwidth allocation to when the bandwidth is actually allocated to the modem 100, but the quality for the actual data transmitted by the data communication is not substantially reduced by this delay.

In this way, the modem 100 performs so-called on-demand bandwidth allocation for the data communication, which is different from the bandwidth allocation for the audio communication. In a case where the value indicating that a packet is for audio communication is not stored in the predetermined field in the header of the packet transmitted to the communication satellite 50, the detecting section 120 determines that the transmitted packet is a packet for data communication. The allocation control section 140 calculates the bandwidth needed for the data communication based on the number of packets per unit time determined to be packets for data communication.

Figure 5:
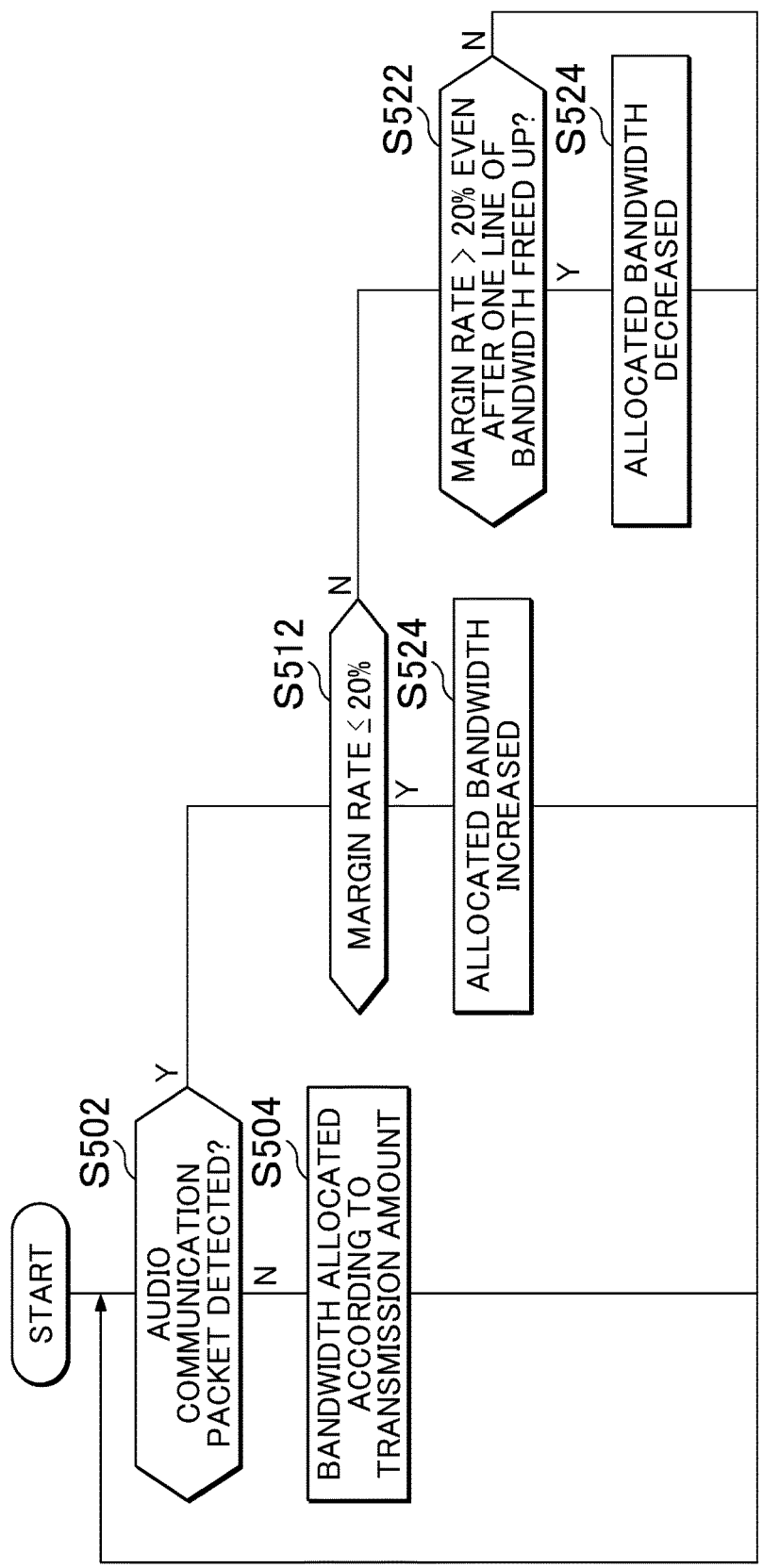
FIG. 5 is a flow chart showing the processes performed by the allocation control section 140.

FIG. 5 is a flow chart showing the processes performed by the allocation control section 140. The processes of this flow chart are started when the power supply of the modem 100 enters the ON state.

At step S502, the allocation control section 140 determines whether an audio communication packet is present among the packets transmitted toward the communication satellite 50. For example, the allocation control section 140 determines whether an audio communication packet has been detected by the detecting section 120 within a predetermined time.

In the determination made in step S502, if it is determined that an audio communication packet is not present, the allocation control section 140 performs bandwidth allocation in accordance with the amount of packet transmission (S504). Specifically, the allocation control section 140 allocates bandwidth corresponding to the amount of packets for non-audio communication transmitted per unit time. When the process of step S504 ends, the processing moves to step S502.

In the determination made in step S502, if it is determined that an audio communication packet is present, the allocation control section 140 performs control to allocate a larger amount of bandwidth than the amount of packet transmission for audio communication, and further sets packets for audio communication in a higher queue of packets for data communication (step S512 to step S524).

When describing the control of the bandwidth allocation in detail, at step S512, the allocation control section 140 determines whether the margin rate of the packets for audio communication is less than or equal to 20%. If it is determined in step S512 that the margin rate of the packets for audio communication is less than or equal to 20%, the minimum bandwidth needed for the margin rate to exceed 20% is additionally allocated for the audio communication (step S514), and the processing moves to step S502.

If it is determined in step S512 that the margin rate of the packets for audio communication is not less than or equal to 20%, at step S522, the allocation control section 140 determines whether the margin rate would exceed 20% even if the bandwidth allocated for the audio communication is reduced by one or more lines. In the determination made in step S522, if it is determined that the margin rate would exceed 20% even if the bandwidth allocated for the audio communication is reduced by one or more lines, the allocation control section 140 frees up the maximum number of lines of bandwidth while still being able to maintain a state in which the margin rate exceeds 20% from the bandwidth allocated to the audio communication (step S524), and the processing moves to step S502. In the determination made in step S522, if it is determined that the margin rate would become less than or equal to 20% when the bandwidth is decreased by one line, the processing moves to step S502.

As described above, with the communication system 5, bandwidth can be shared between the ground communication system 7 and the ground communication system 8 by dynamically allocating bandwidth for the communication via the communication satellite 50. Here, with the modem 100, when dynamically allocating the bandwidth, the excess bandwidth is ensured in advance with priority for the audio communication, and therefore it is possible to restrict the decrease in quality of the audio communication that has already begun due to the occurrence of new audio communication. In this way, with the communication system 5, the bandwidth is ensured in advance with priority and the bandwidth is ensured on-demand, according to the type of communication, such as audio communication and data communication. Therefore, for communication such as audio communication where there is a high possibility of delay, variation in the delay, reversal of order, and loss of packets, it is possible to allocate bandwidth in advance and to set a suitable queue enabling communication quality to be preserved. This control can be applied to communication on communication lines with limited bandwidth, such as in satellite communication.

Most of the above description relates to a case in which a predetermined bandwidth of 64 kbps or the like is set for each one line, for the audio communication. However, the bandwidth set per one line is not limited to a specified value such as 64 kbps. Furthermore, the bandwidth set per one line may adopt a value that is different for every base station 30 and base station 31.

Most of the above description relates to a case in which a predetermined ratio such as 20% is used as the margin rate of the bandwidth ensured in advance for the audio communication. However, the margin rate is not limited to a specified ratio such as 20%. Furthermore, the margin rate may differ according to the bandwidth needed for the current audio communication. For example, the margin rate may differ according to the number of lines of audio communication currently occurring. The margin rate may adopt a different ratio for every base station 30 and base station 31. Furthermore, the allocation control section 140 may determine the excess bandwidth, the margin rate, or the like ensured in advance for the audio communication based on the occurrence history of audio communication in the past. The allocation control section 140 may determine the excess bandwidth, the margin rate, or the like ensured in advance for the audio communication in every time span based on the occurrence history of the audio communication in each time span in the past. The allocation control section 140 may determine the excess bandwidth, the margin rate, or the like ensured in advance for the audio communication in every season based on the occurrence history of the audio communication in each season in the past.

Most of the above description relates to a case in which the occurrence of audio communication is detected by the detecting section 120. However, when new audio communication occurs, the base station 30 may notify the modem 100 that new audio communication has occurred. When the modem 100 receives notification from the base station 30 that new audio communication from the base station 30 has occurred, the allocation control section 140 may ensure the excess bandwidth for the audio communication, with the same control as used when the detecting section 120 detects that the audio communication has occurred. Furthermore, the base station 30 may request the transmission of packets for the audio communication to the modem 100, such that the excess bandwidth is ensured in the modem 100.

In a case where bandwidth cannot be further allocated for the audio communication, the modem 100 may notify the base station 30 of the fact that it is impossible to allocate further bandwidth. When the notification that it is impossible to allocate further bandwidth is received from the modem 100, the base station 30 may limit the new audio communication. For example, the base station 30 may limit new calls.

Audio communication of audio traffic as IP packets in the base station 30, VoIP realized on a 3G communication line or another line, Voice Over LTE realizing audio communication on Long Term Evolution (LTE), or the like can be adopted as the audio communication.

The user terminal 40, the user terminal 41, user terminal 42, and the user terminal 43 may be mobile information terminals such as a tablet terminal or the like, in addition to being a mobile telephone such as a so-called smartphone or the like. Various electronic devices having telephone functions, such as a so-called land phone or a computer having a phone function can be adopted as the user terminal.

Each component of the modem 100 may be realized by hardware or software. Each component of the modem 100 may be realized by a combination of hardware and software. Furthermore, a computer may realize the functions of the modem 100 by a computer, by executing the program. The program may be installed in a computer forming at least a portion of the modem 100, from a computer readable medium or a storage apparatus connected to a network.

The programs that are installed in the computer and cause the computer to function as the modem 100 according to the present embodiment operate on an MPU or the like to cause the computer to function as each section of the modem 100. The information processing recorded in these programs is read by the computer, thereby causing the software and hardware resources of the modem 100 to cooperate and function as these specific means. The computer includes various memories such as an MPU, a ROM, a RAM, and an EEPROM (Registered Trademark), a communication bus, and an interface, and may function as the modem 100 by having the MPU read and sequentially execute the processing programs stored in the ROM as software in advance.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

2: communication system, 4: satellite communication system, 6, 7, 8: ground communication system, 10, 11, 12: satellite communication apparatus, 20, 21, 22: IF conversion apparatus, 30, 31, 32: base station, 40, 41, 42, 43: user terminal, 50: communication satellite, 60: base station control apparatus, 62: moving communication exchange station, 66: public telephone exchange line network, 100, 101, 102: modem, 120: detecting section, 140: allocation control section, 180: sending/receiving section, 190, 191, 192: antenna

What is claimed is:

1. A data communication apparatus that communicates via a satellite, comprising:
an allocation control section that allocates in advance, for audio communication via the satellite, a bandwidth that is larger than a bandwidth needed for current audio communication being performed via the satellite by at least a predetermined bandwidth, wherein
the allocation control section is configured to set a difference between the bandwidth allocated in advance for the audio communication via the satellite and the bandwidth needed for the current audio communication to be larger as the bandwidth needed for the current audio communication becomes larger, and when the bandwidth needed for the current audio communication decreases, the allocation control section is configured to decrease the bandwidth allocated for the audio communication via the satellite in a manner to realize a state in which the bandwidth allocated for the audio communication via the satellite remains larger than the bandwidth needed for the current audio communication after the decrease by at least the predetermined bandwidth.

2. The data communication apparatus according to claim 1, wherein
the predetermined bandwidth is the bandwidth needed for one line of audio communication via the satellite.

3. The data communication apparatus according to claim 1, wherein
the allocation control section is configured to allocate in advance, for the audio communication via the satellite, the bandwidth that is larger than the bandwidth needed for current audio communication by at least the predetermined bandwidth for both an upload direction and a download direction.

4. The data communication apparatus according to claim 1, wherein
the allocation control section is configured to adjust the bandwidth allocated in advance for the audio communication via the satellite such that a ratio of the bandwidth allocated in advance for the audio communication via the satellite to the bandwidth needed for the current audio communication exceeds a predetermined threshold value.

5. The data communication apparatus according to claim 1, wherein
when a packet for audio communication is detected from among packets transmitted via the satellite, the allocation control section is configured to allocate a bandwidth larger than or equal to the bandwidth needed for two lines of audio communication for the audio communication via the satellite.

6. A non-transitory computer readable storage medium storing a program that causes a computer to function as the data communication apparatus according to claim 1.

7. A satellite communication system comprising:
the data communication apparatus according to claim 1; and
the satellite.

8. A data communication apparatus that communicates via a satellite, comprising:
an allocation control section that allocates in advance, for audio communication via the satellite, a bandwidth that is larger than a bandwidth needed for current audio communication being performed via the satellite by at least a predetermined bandwidth, wherein
the allocation control section sets a difference between the bandwidth allocated in advance for the audio communication via the satellite and the bandwidth needed for the current audio communication to be larger as the bandwidth needed for the current audio communication becomes larger, and
wherein packets are communicated based on the difference ensuring excess bandwidth.

9. The data communication apparatus according to claim 8, wherein
the predetermined bandwidth is the bandwidth needed for one line of audio communication via the satellite.

10. The data communication apparatus according to claim 8, wherein
the allocation control section allocates in advance, for the audio communication via the satellite, a bandwidth that is larger than or equal to the predetermined bandwidth for both an upload and a download direction.

11. The data communication apparatus according to claim 8, wherein
in a state where bandwidth is not allocated for the audio communication via the satellite, when a packet for audio communication is detected from among packets transmitted via the satellite, the allocation control section allocates a bandwidth larger than or equal to the bandwidth needed for two lines of audio communication for the audio communication via the satellite.

12. A non-transitory computer readable storage medium storing a program that causes a computer to function as the data communication apparatus according to claim 8.

13. A satellite communication system comprising:
the data communication apparatus according to claim 8; and
the satellite.

14. A data communication apparatus that communicates via a satellite, comprising:
an allocation control section that allocates in advance, for audio communication via the satellite, a bandwidth that is larger than a bandwidth needed for current audio communication being performed via the satellite by at least a predetermined bandwidth, wherein
the allocation control section adjusts the bandwidth allocated in advance for the audio communication via the satellite such that a ratio of the bandwidth allocated in advance for the audio communication via the satellite to the bandwidth needed for the current audio communication exceeds a predetermined threshold value, and
wherein packets are communicated based on the adjusted bandwidth ensuring excess bandwidth.

15. The data communication apparatus according to claim 14, wherein
the predetermined bandwidth is the bandwidth needed for one line of audio communication via the satellite.

16. The data communication apparatus according to claim 14, wherein
the allocation control section allocates in advance, for the audio communication via the satellite, the bandwidth that is larger than the bandwidth needed for current audio communication by at least the predetermined bandwidth for both an upload and a download direction.

17. The data communication apparatus according to claim 14, wherein
in a state where bandwidth is not allocated for the audio communication via the satellite, when a packet for audio communication is detected from among packets transmitted via the satellite, the allocation control section allocates a bandwidth larger than or equal to the bandwidth needed for two lines of audio communication for the audio communication via the satellite.

18. A non-transitory computer readable storage medium storing a program that causes a computer to function as the data communication apparatus according to claim 14.

19. A satellite communication system comprising:
the data communication apparatus according claim 14; and
the satellite.

20. A data communication apparatus that communicates via a satellite, comprising:
an allocation control section that allocates in advance, for audio communication via the satellite, a bandwidth that is larger than a bandwidth needed for current audio communication being performed via the satellite by at least a predetermined bandwidth, wherein
the allocation control section is configured to set a difference between the bandwidth allocated in advance for the audio communication via the satellite and the bandwidth needed for the current audio communication to be larger as the bandwidth needed for the current audio communication becomes larger, and when the bandwidth needed for the current audio communication decreases, the allocation control section is configured to decrease the bandwidth allocated for the audio communication via the satellite.

* * * * *